United States Patent Office 2,813,862
Patented Nov. 19, 1957

2,813,862

PROCESS OF PREPARATION OF HETEROCYCLIC COMPOUNDS EMPLOYING ACETYLENE ETHERS

Josef Ferdinand Arens, Groningen, Netherlands, assignor to Organon, Inc., Orange, N. J., a corporation of New Jersey No Drawing. Application December 22, 1954,
Serial No. 477,123

Claims priority, application Netherlands
December 23, 1953

6 Claims. (Cl. 260—243)

The present invention relates to new heterocyclic compounds and to a process of producing such and other heterocyclic compounds having two hetero atoms in their molecule.

Heterocyclic compounds are often produced by using suitable bifunctional compounds as starting materials and subjecting such compounds to a ring closure reaction either with itself or, for instance, with other suitable compounds which also may be of bifunctional nature.

It is one object of the present invention to provide a simple, new and advantageous process of preparing heterocyclic compounds with two hetero atoms in their molecule.

Another object of the present invention is to provide new heterocyclic compounds having two hetero atoms in their molecule. Other objects of the present invention and advantageous features thereof will become apparent as the description proceeds.

Compounds made according to this process are of great value as intermediate products, as pharmaceutical compounds, for preparing therapeutically effective compounds, and for numerous technical purposes, such as softening agents for textiles, emulsifiers, flotation aids, additives to asphalt, as fungicides and insecticides.

Many of the compounds herein set forth and made in accordance with the new process of this invention are referred to and identified in the work of K. Hofmann entitled, "Imidazole and its Derivatives" (consult particularly pages 224–226, and the publication referred to in the bibliography notes) showing the uses of these compounds in the arts. With respect to the compounds referred to in this application, including the new compounds thereof, all of such compounds are of use and advantages in the same arts and in the same manner as set forth in the reference to Hofmann's work.

In principle, the process according to the present invention, whereby heterocyclic compounds having two hetero atoms in their molecule are obtained, comprises reacting an alkoxy acetylene compound such as methoxy-, ethoxy-, propoxy- or butoxyacetylenes with a bifunctional organic compound which is substituted by an amino group as well as a reactive group selected from the group consisting of a thiol group, a hydroxyl group, an amino group, and a mono-substituted amino group, i. e. a primary and secondary amino group. Thereby ring closure is effected according to the following equation

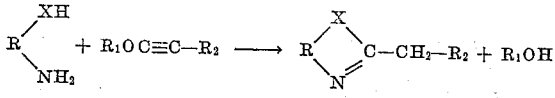

In said formulas

R is a hydrocarbon radical which may be substituted, such as, for instance, an aliphatic, aromatic, or alicyclic hydrocarbon radical or a radical with a condensed nucleus, such as a naphthalene, anthracene, phenanthrene or the like radical;

X indicates oxygen, sulfur, the imino group, or the —NR$_3$— group;

R$_3$ is a substituted or unsubstituted alkyl, alicyclic, aryl, or aralkyl radical;

R$_1$ is an alkyl or aryl radical;

R$_2$ is hydrogen or an alkyl, aryl, or aralkyl radical which may be substituted.

It is very surprising that the alkoxy acetylene compounds react easily with said bifunctional organic compounds and that they participate in the ring closure reaction with only one of their acetylene carbon atoms.

Ring closure is frequently effected in solution in a solvent, such as aliphatic alcohols, ethers, hydrocarbons, chlorinated lower aliphatic hydrocarbons, cyclic ethers e. g. benzene, ether, dichloroethane, dioxane. It is, however, the preferred procedure to carry out the process according to the present invention in the absence of a solvent. In this case, the reaction components are heated under reflux and, thereby, ring closure is effected. One may also treat the reaction mixture in a sealed reaction vessel under pressure, a procedure which frequently is required in cases where the reaction proceeds too slowly at atmospheric pressure. Alternatively a catalyst such as a metallic oxyd or salt e. g. mercuri oxyd or mercuri sulphate can be added. In case the reaction proceeds very easily, as e. g. between ethoxyacetylene and ethylene diamine, the components can also be kept at room temperature for some time.

After ring closure is completed, the reaction product is isolated from the reaction mixture, for instance, directly by crystallisation on cooling said mixture or by fractional distillation.

The new compounds can readily be converted into their picrates.

The process according to the present invention is especially suitable for preparing azoles, azines, and their 1-N-substitution products.

Bifunctional starting materials which are advantageously used in the process according to the present invention are amino alcohols, diamines, and amino thioalcohols. Selected in part for specific examples, reference is made especially to the following as starting materials: ethanol amine, 2-amino propanol-1, o-amino phenol, ethylene diamine, o-phenylene diamine, mercapto ethyl amine, o-amino benzyl alcohol, 3-amino propanol-1, and 1-monododecyl amino-2-amino ethane.

The above mentioned diamines may be substituted in one of their nitrogen atoms so that after ring closure reaction according to the present invention, for instance, N-substituted imidazoles or N-substituted diazines, and derivatives therefrom are obtained.

Examples of suitable alkoxy acetylene compounds usable as starting materials in carrying out the process of this invention are: methoxy acetylene, ethoxy acetylene, 1-ethoxy-2-ethyl acetylene, 1-ethoxy-2-phenyl acetylene, 1-ethoxy-2-α-naphthyl acetylene, 1-ethoxy-2-nonacosyl acetylene, and propoxy acetylene.

These and other alkoxy derivatives of acetylene usable as starting materials in carrying out the process of this invention are, for instance, produced according to Van Dorp, Arens and Stephenson "Recueil des Traveaux Chimique des Pays-Bas" vol. 70, page 289 (1951).

The process according to the present invention presents an entirely new route of preparing heterocyclic compounds with two hetero atoms in their molecule and having five, six, or more atoms in their heterocyclic nucleus, such as the sepazines, and oxazonines.

The process according to the present invention can be employed, for instance, for preparing heterocyclic compounds having two hetero atoms in their molecule and being substituted in 2-position. New compounds of this type are, for instance, the 2-substituted oxazines. By reacting, for instance, ethoxy acetylene with 3-aminopropanol-1 there is obtained the 2-methyl-5,6-dihydro-1,3-oxazine which boils at 40–45° C./43 mm. $n_D^{26}=1.4446$; its picrate has a melting point of 100–102° C.

For instance, 2-methyl-1-dodecyl imidazoline can be prepared by reacting ethoxy acetylene with 1-monododecyl amino-2-amino ethane. This imidazoline compound is bacteriostatically highly effective (again consult reference to Hofmann's work). In general, imidazoline compounds of the following formula

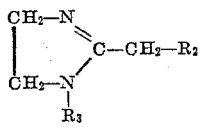

wherein $R_2$ and $R_3$ indicate the same radicals as before, such as the methyl, ethyl, amyl, decyl, tetradecyl, hendecyl groups. These radicals can be obtained according to the method of the present invention. These compounds are also highly effective bacteriostatic agents.

2-benzyl-2-imidazoline is a well known vasodilator and hypotensive agent. It is readily obtained in a very simple manner by ring closure between ethylene diamine and 1-ethoxy-2-phenyl acetylene.

The known vasoconstrictor agent 2-(1-naphthyl methyl)-2-imidazoline is obtained according to the present invention by reacting ethylene diamine and 1-ethoxy-2-α-naphthyl acetylene.

By reaction of ethylene diamine and 1-ethoxy-2-nonacosyl acetylene there is obtained the 2-triacontyl imidazoline which has proved to be highly toxic to the red-colored spider of the tropics and is successfully used as a pesticide therefor.

2-heptadecyl-2-imidazoline, which is also readily obtainable by the process according to the present invention, is a useful foliage fungicide for the control of apple scab (*Venturia inaequalis*) as well as of cherry leaf spot (*Coccomyces hiemalis*).

2-alkyl substituted 2-imidazolines exhibit surface-active properties, which make them useful as emulsifiers, textile aids, flotation agents, asphalt additives, and for other technical purposes.

The following examples serve to illustrate the present invention without, however, limiting the same thereto.

EXAMPLE 1

*2-methyl oxazoline*

A mixture of 5.7 g. (0.093 mol) of freshly distilled ethanol amine and 6.5 g. (0.093 mol) of ethoxy acetylene are heated under reflux on an oil bath at 100° C. Boiling ceases after 30 minutes due to an increase in the boiling point of the reaction mixture. The odor of ethoxy acetylene is no longer perceptible.

The reaction mixture is subjected to fractional distillation at a Hg-pressure of 700 mm. The first fraction contains ethanol. Thereafter 3.5 g. of 2-methyl oxazoline boiling between 100° C. and 107° C. distill over, most of it at a temperature of 106–107° C. Its odor is similar to that of pyridine. Mixing said compound with a cold saturated alcoholic solution of picric acid yields the picrate of 2-methyl oxazoline which melts at 158–161° C. If said compound is allowed to stand in its mother-liquor, it gradually goes in solution and yields the picrate of β-acetoxy ethyl amine.

EXAMPLE 2

*2,4-dimethyl oxazoline*

A mixture of 6 g. of ethoxy acetylene and of 6.25 g. of dl-2-amino-1-propanol is heated to boiling under reflux. After about 4 hours, the boiling point of said mixture does no longer increase. The reaction mixture is allowed to stand overnight and is then subjected to fractional distillation at a Hg-pressure of 700 mm. The first fraction boiling between 55° C. and 74° C. is collected and amounts to 0.25 g. The second fraction boils between 74° C. and 87° C. and consists mainly of ethanol in the amount of 2.25 g. Distillation is continued in a vacuum whereby a separate cooled collecting flask is arranged between vacuum pump and distillation flask. 3.75 g. of 2,4-dimethyl oxazoline distill at 30° C. and a Hg-pressure of 35 mm.; its $n_D^{25}$ is 1.4220. The last portion of this fraction which is collected separately represents pure 2,4-dimethyl oxazoline with $n_D^{25}=1.4246$. This compound has an odor similar to that of α-picoline. The residue in the distillation flask amounts to 1.25 g. In the cooled collecting flask there are collected 2 g. of a liquid having $n_D^{25}=1.4064$. This fraction consists mainly of 2,4-dimethyl oxazoline. The picrate obtained from said 2,4-dimethyl oxazoline melts at 130–135° C. and decomposes on recrystallisation.

EXAMPLE 3

*2-methyl imidazoline (lysidine)*

A mixture of 7 g. of freshly distilled ethylene diamine and 5.75 g. of ethoxy acetylene are caused to react by heating to boiling. Reaction is completed by boiling at 100° C. in an oil bath for half an hour. On cooling, 2-methyl imidazoline crystallises. The precipitated crystals are separated by filtration from the mother-liquor. Evaporating the mother-liquor in a vacuum yields a second batch of crystals. The total yield amounts to 3.5 g. of 2-methyl imidazoline melting at 98–101° C. Its picrate is obtained by reacting said compound with a saturated alcoholic solution of picric acid. The melting point of the crude picrate is 197°–201° C. After recrystallisation from water, the melting point of the picrate is increased to 200–203° C. (not corrected).

EXAMPLE 4

*2-methyl benzimidazole*

A mixture of 3 g. of ethoxy acetylene and 4.6 g. of o-phenylene diamine is heated to boiling under reflux for 8 hours. The resulting homogeneous solution is cooled, 10 cc. of low boiling petroleum ether are added thereto, and the precipitated unreacted o-phenylene diamine, in the amount of 2.5 g., is filtered off. The filtrate is evaporated to dryness and the resulting residue is allowed to stand. Part thereof solidifies on standing. The crystals are filtered off and recrystallised from water. 1 g. of 2-methyl benzimidazole melting at 173–175° C. are obtained thereby.

EXAMPLE 5

*2-methyl thiazoline*

6.6 g. of mercapto ethyl amine and 6.0 g. of ethoxy acetylene are boiled under reflux for two hours. The reaction mixture is subjected to fractional distillation in the same manner as described in Example 1. 1.5 g. of a first fraction boiling at 75–76° C. are obtained. This fraction consists mainly of ethanol. The second fraction, in the amount of 3.75 g., contains 2-methyl thiazoline, a liquid which smells like pyridine and has a boiling point of 50–53° C. at a Hg-pressure of 30 mm. 3.75 g. of a viscous brown oil remain as residue in the distillation flask. The cooled collecting flask between vacuum pump and distillation flask contains 2 g. of a clear liquid which mainly consists of ethanol.

Redistillation of the second fraction yields a liquid which boils at 50° C. at a Hg-pressure of 28 mm. Its $n_D^{24.5}$ is 1.5128. Its picrate has a melting point of 169–170° C.

EXAMPLE 6

*2-methyl-1-dodecyl imidazoline-2*

5 g. of ethoxy acetylene and 15.4 g. of 1-monododecyl amino-2-amino ethane are boiled under reflux on an oil bath of 100° C. for two hours. Thereafter the reaction mixture is subjected to vacuum distillation. Thereby 1.71 g. of 2-methyl-1-dodecyl imidazoline-2 are obtained in the form of an oil which boils at 170–175° C. under a Hg-pressure of 4 mm.

EXAMPLE 7

*2-propyl imidazoline-2*

A mixture of 2 g. of anhydrous ethylene diamine and 4.9 g. of 1-ethoxy-2-ethyl acetylene and 100 mg. mercuric oxide are boiled under reflux on an oil bath of 120° C. The reaction is completed after 2 hours and the reaction mixture is subjected to fractional vacuum distillation. 2-propyl imidazoline-2 distills at 135–140° C. under a Hg-pressure of 25 mm. It is collected in the form of a colorless liquid which solidifies on cooling. 2.01 g. of 2-propyl imidazoline-2 melting at 34–35° C. are obtained. Its picrate melts at 128–129° C.

EXAMPLE 8

*2-benzyl imidazoline-2*

6 g. of ethylene diamine and 16 g. of 1-ethoxy-2-phenyl acetylene are heated in a sealed heavy-walled glass tube at 150° C. for two hours. After cooling, the reaction mixture is subjected to fractional vacuum distillation. 3.9 g. of pure 2-benzyl imidazoline-2 distill over at 120–130° C. and a Hg-pressure of 4 mm. Said compound, after cooling in the recipient, crystallises and melts at 66–68° C. Its picrate has a melting point of 145–146° C.

EXAMPLE 9

*2-methyl-$\Delta^2$-dihydro oxazine-1,3*

A mixture of 3.75 g. of 3-amino propanol-1 and 3.0 g. of ethoxy acetylene is heated under reflux at 110° C. for 3 hours. The resulting reaction mixture is subjected to fractional distillation and the fraction distilling between 133° C. and 138° C. is collected and again distilled. Thereby 3 g. of 2-methyl-$\Delta^2$-dihydro oxazine-1,3-boiling at 133–133.5° C. are obtained.

*Analysis.*—Calculated for $C_5H_9ON$: 60.58% C; 9.15% H; 14.13% N. Found: 59.44%, 59.53% C; 9.33%, 9.29% H; 13.7%, 13.6% N. $n_D^{26}=1.4449$.

The melting point of the picrate obtained by reacting said compound with an ethereal solution of picric acid is 103.5–104.0° C.

EXAMPLE 10

*2-methyl-3,4,5,6-tetrahydropyrimidine*

4 g. of ethoxy acetylene are heated under reflux with 5 g. of 1,3-diamino propane. Reaction sets in at 40° C. The mixture is heated to 110° C. for 30 minutes. The reaction product is distilled in a vacuum. 6.46 g. of crystalline-2-methyl-3,4,5,6-tetrahydropyrimidine boiling at 99–102° C./7 mm. are obtained thereby. Its picrate melts at 153–153.5° C.

EXAMPLE 11

*2-methyl-4,5-benzoxazine-1,3*

A mixture of 2.44 g. of o-amino benzyl alcohol in 3.16 g. of ethoxy acetylene is heated to boiling under reflux for 8½ hours. Thereafter the mixture is subjected to vacuum distillation. Thereby 0.725 g. of a thickly liquid oil are obtained. Said oil boils between 94° C. and 115° C. under a Hg-pressure of 3 mm. The picrate prepared therefrom melts at 145–148° C. 2.19 g. of said picrate are obtained thereby.

EXAMPLE 12

*2-methyl-4,6-dihydro-1,3-thiazine*

A mixture of 3.0 g. of ethoxy acetylene and 4.5 g. of 1-thiol-3-amino propane is boiled under reflux until the thermometer, inserted into the boiling mixture, does no longer indicate an increase in boiling point. The reaction mixture is distilled under atmospheric pressure. The fraction distilling at 170–176° C. is collected and yields 3.5 g. of 2-methyl-5,6-dihydro-1,3-thiazine. Its picrate melts at 135–136° C.

EXAMPLE 13

*2-(1-naphthyl methyl)-2-imidazoline*

2.9 g. of ethylene diamine and 9.8 g. of 1-ethoxy-2-(1-naphthyl) acetylene are heated in a sealed heavy-walled glass tube at 150° C. for two hours. The reaction mixture is subjected to fractional vacuum distillation. The fraction distilling between 120° C. and 140° C. under a Hg-pressure of 4 mm. is collected and yields 7.1 g. of 2-(1-naphthyl methyl)-2-imidazoline which crystallise, on cooling, in the receiver. Its melting point is 133–134° C.

EXAMPLE 14

*2-heptadecyl-2-imidazoline*

2.9 g. of anhydrous ethylene diamine and 14.7 g. of 1-ethoxy-2-hexadecyl acetylene are heated under reflux on an oil bath of 120° C. The reaction is completed after 2 hours. The reaction mixture is subjected to fractional vacuum distillation whereby the reaction product is collected as a colorless liquid which solidifies on cooling. 6.2 g. of 2-heptadecyl-2-imidazoline melting at 94–95° C. are obtained thereby.

EXAMPLE 15

*2-methyl-4,5,6,7-tetrahydro-1,3-diazepine*

A mixture of 2.1 g. of 1,4-diamino butane and 2.1 g. of ethoxy acetylene is heated to 75° C. Reaction sets in spontaneously. Thereafter the mixture is heated at 120° C. for 30 minutes and is distilled in a vacuum. 1.6 g. of a viscous liquid boiling between 150° C. and 190° C. are obtained. Said compound decomposes on storage.

The picrate obtained in ethereal medium has a melting point of 132° C. in nitrogen atmosphere.

EXAMPLE 16

*2-methyl-4,5,6,7,8,9-hexahydro-1,3-oxazonine*

7.5 g. of amino hexanol boiling at 225–230° C. are boiled under reflux with 9 g. of ethoxy acetylene at 55° C. for 7 hours. The reaction mixture is subjected to fractional distillation at atmospheric pressure whereby first 1 g. of a mixture of ethanol and ethoxy acetylene and thereafter 4.5 g. of ethoxy acetylene are collected. The residue is subsequently distilled in a vacuum of 2 mm. Hg-pressure. The fraction boiling between 116° C. and 125° C. is collected and represents 2-methyl-4,5,6,7,8,9-hexahydro-1,3-oxazonine.

EXAMPLE 17

The heterocyclic compounds which have been prepared with ethoxyacetylene can similarly be prepared with methoxyacetylene, propoxyacetylene or butoxyacetylene.

EXAMPLE 18

*2-methyl-1-decyl imidazoline-2*

3 g. of ethoxyacetylene and 9.1 g. of 1-decyl amino-2-amino ethane are boiled under reflux on an oil bath for two hours. Thereafter the reaction mixture is subjected to vacuum distillation, whereby 4.3 g. of 2-methyl-1-decyl imidazoline-2 are obtained in the form of an oil which boils at 135–136° C. under a Hg-pressure of 3 mm.

EXAMPLE 19

*2-methyl-1-heptyl imidazoline-2*

3.5 g. of ethoxyacetylene and 7.5 g. of 1-heptyl amino-2-amino ethane are boiled under reflux on an oil bath for two hours. Thereafter the reaction mixture is subjected to vacuum distillation, whereby 3.7 g. of 2-methyl-1-heptyl imidazoline-2 are obtained in the form of an oil which boils at 107–109° C. under a Hg-pressure of 2.5 mm.

EXAMPLE 20

*2-methyl-1-benzyl imidazoline-2*

6.0 g. of ethoxyacetylene and 13.1 g. of 1-benzylamino-2-amino ethane are boiled under reflux on an oil bath for two hours. Thereafter the reaction mixture is subjected to vacuum distillation, whereby 6.9 g. of 2-methyl-1-benzyl imidazoline-2 are obtained in the form of an oil which boils at 162–163° C. under a Hg-pressure of 16 mm.

EXAMPLE 21

*2-methyl-1-tetradecyl imidazoline-2*

5.5 g. of ethoxyacetylene and 19.4 g. of 1-tetradecylamino-2-amino ethane are boiled under reflux on an oil bath for two hours. Thereafter the reaction mixture is subjected to vacuum distillation, whereby 9.3 g. of 2-methyl-1-tetradecyl imidazoline-2 are obtained in the form of an oil which boils at 191–193° C. under a Hg-pressure of 6 mm.

EXAMPLE 22

*2-methyl oxazoline*

A mixture of 5.7 g. of freshly distilled ethanol amine, 6.5 g. of ethoxyacetylene and 10 ml. of dioxane are heated under reflux on an oil bath. Boiling ceases after 40 minutes due to a rise of the boiling point of the reaction mixture. The reaction mixture is further treated as indicated in Example 1.

EXAMPLE 23

*2-methyl imidazoline (Lysidine)*

A mixture of 7 g. of freshly distilled ethylene diamine, 10 ml. of ether or ethanol and 5.75 g. of ethoxyacetylene are stirred under reflux until a homogeneous solution is obtained. The 2-methylimidazoline is isolated by evaporation of the ether and the alcohol formed in the reaction.

EXAMPLE 24

*2-methyl benzimidazole*

A mixture of 3 g. of ethoxyacetylene, 5 ml. of dichloroethane and 4.6 g. of o-phenylene diamine is heated to boiling under reflux for 8 hours. Thereafter the mixture is treated according to Example 4.

EXAMPLE 25

*2-methyl thiazoline*

A mixture of 6.6 g. of mercapto ethyl amine, 6.0 g. of ethoxyacetylene and 10 ml. of benzene are boiled under reflux for two hours. The reaction mixture is subjected to fractional distillation. The desired compound distills at 50–53° C. at a Hg-pressure of 30 mm.

EXAMPLE 26

*1-ethoxy-2-ethylacetylene*

7 g. of ethoxyacetylene are slowly added to a solution of 0.1 ml. ethylmagnesiumbromide in ether. After the evolution of ethane has subsided, a solution of 20 g. of ethyl para toluene sulfonate in ether is added. The mixture is refluxed for 5 hours, diluted with water and the ether layer fractionally distilled. The ethylethoxyacetylene is obtained as a colorless oil. Boiling point 55–63° C. at 135 mm. Hg-pressure.

EXAMPLE 27

*1-ethoxy-2(1-naphthyl)acetylene*

7 g. of ethoxyacetylene are slowly added to a solution of 0.1 mol. ethylmagnesiumbromide in ether. After the evolution of ethane has subsided, a solution of 30 g. of 1-naphthyl para toluene sulfonate in ether is added. The mixture is refluxed for 6 hours, diluted with water and the ether layer fractionally distilled. The 1-ethoxy-2(1-naphthyl) acetylene is obtained as a colorless oil with a boiling point of 110–120° C. at 0.001 mm. Hg-pressure.

EXAMPLE 28

*1-ethoxy-2-hexadecyl acetylene*

7 g. of ethoxyacetylene are slowly added to a solution of 0.1 mol ethylmagnesiumbromide in ether. After the evolution of ethane has subsided, a solution of 32 g. of hexa-decyliodide in ether is added. The mixture is refluxed for 5 hours, diluted with water and the ether layer fractionally distilled. The 1-ethoxy-2-hexadecyl acetylene is obtained as a colorless oil with a boiling point of 105–120° C. at 0.001 mm. Hg-pressure.

EXAMPLE 29

*1-ethoxy-2-phenyl-acetylene*

7 g. of ethoxyacetylene are slowly added to a solution of 0.1 mol ethylmagnesiumbromide in ether. After the evolution of ethane has subsided, a solution of 24 g. of phenyl para toluene-sulfonate in ether is added. The mixture is refluxed for 5 hours, diluted with water and the ether layer fractionally distilled. The 1-ethoxy-2-phenyl acetylene is obtained as a colorless oil with a boiling point of 40–60° C. at 0.0015 mm. Hg-pressure.

In place of ethoxyacetylene, mentioned in Example 1 as the one reaction component, there can be employed equi-molecular amounts of other alkoxy or aryloxy acetylene compounds, such as:

1-alkoxy-2-tert. butylacetylene,
1-alkoxy-2-isopropylacetylene,
1-alkoxy-2-cyclohexylacetylene,
1-alkoxy-2-(4-methyl)-cyclohexylacetylene,
Phenoxy-acetylene,
Ethylphenoxy-acetylene,
Butylphenoxy-acetylene,
1-methoxy-acetylene,
1-propoxy-acetylene,
1-butoxy-acetylene,
1-alkoxy-2-methyl-acetylene,
1-alkoxy-2-butyl-acetylene,
1-alkoxy-2-amyl-acetylene,
1-alkoxy-2-decyl-acetylene,
1-alkoxy-2-tetradecyl-acetylene,
1-alkoxy-2-octadecyl-acetylene,
1-alkoxy-2-eicosyl acetylene,
1-alkoxy-2-tetracosyl-acetylene,
1-alkoxy-2-(p-tolyl)-acetylene,
1-alkoxy-2-diphenyl-acetylene,
1-alkoxy-2-(diphenyl methyl)-acetylene,
1-alkoxy-2-fluorenyl-acetylene,
1-alkoxy-2-benzyl-acetylene,
1-alkoxy-2-tetrahydronaphthyl-acetylene,
1-alkoxy-2-($\alpha$-methyl naphthyl)-acetylene,
1-alkoxy-2-acenaphthyl-acetylene,
1-alkoxy-2-indenyl-acetylene,
1-alkoxy-2-anthracyl-acetylene,
1-alkoxy-2-phenanthryl-acetylene.

In other respects, the steps set forth in Example 1 are followed and carried out.

The aforementioned alkoxy acetylene compounds can be substituted in equimolecular amounts for the specific alkoxy-acetylene compounds set forth in Examples 2 to 16; otherwise, the steps set forth in each of said examples are followed and carried out.

In place of ethanol amine mentioned in Example 1 used as the other reaction component of the formula

there can be employed equimolecular amounts of other compounds of said formula, such as:

3-amino-propanol-1,
3-amino-butanol-1,
4-amino-pentanol-1,
5-amino-hexanol-1,
2-amino-propanol-1,
2-amino-butanol-1,
1,3-diamino-propane,
1,4-diamino-butane,
1,5-diamino-pentane,
1,2-diamino-propane,
1,2-diamino-butane,
1-amino-2-amino-cyclohexyl-amino-ethane,
1-amino-2-methyl amino-ethane,
1-amino-2-pentyl-amino-ethane,
1-amino-2-monohexadecyl-amino-ethane,
1-amino-2-phenyl-amino-ethane,
1-amino-3-tolyl-amino-propane,
1-amino-2-naphthyl-amino-ethane,
1-amino-2-benzyl-amino-ethane,
1-amino-3-thiol-propane,
1-amino-4-thiol-butane,
1-amino-6-thiol-hexane,
o-Phenylene-diamine,
1-methyl-2,3-diaminobenzene,
1-methyl-3,4-diaminobenzene,
o-Diamino-cyclohexane,
1-aminol-2-thiol-ethane,
Valinol,
Isoleucinol,
Methioninol,
Phenylalaninol,
Leucinol,
Serinol,
Tryptophanol,
1,2-naphthylene-diamine,
o-Amino-phenol,
1-amino-2-naphthol,
2-amino-1-naphthol,
2-amino-diphenylamine,
2-amino-benzyl-alcohol,
2-amino-4-methyl-phenol,
2-amino-thiophenol.

In other respects, the steps set forth in Example 1 are followed and carried out.

The aforementioned bifunctional organic compounds of the formula

can be substituted in equimolecular amounts for the specific bifunctional organic compounds set forth in Examples 2 to 16; otherwise, the steps set forth in each of said examples are followed and carried out. The same substitution may be made with the alkoxyacetylene compounds set forth above.

In all of the examples and modifications thereof as set forth, ring closure yields the various dihetero-atomic five, six, and more-membered heterocyclic compounds such as the corresponding 1,3-oxazole, 1,3-thiazole, 1,3-imidazole, 1,3-oxazine, 1,3-thiazine, 1,3-diazine compounds and similar heterocyclic compounds with 7 and 8 and more members in the heterocyclic nucleus.

It is evident that the new process according to the present invention is of general application and leads to the formation of heterocyclic compounds having in 3-position a nitrogen atom in their heterocyclic nucleus and in 1-position a oxygen, nitrogen or sulfur atom as a member of said nucleus and carrying a double bond between said first mentioned nitrogen atom and the carbon atom in 2-position of said nucleus, said carbon atom being in turn substituted by a methyl, other alkyl, an alicyclic, a methyl aryl, or aralkyl radical.

Many of the compounds herein set forth and made in accordance with the new process of this invention are referred to and identified in the work of K. Hofmann entitled, "Imidazole and its Derivatives" (consult particularly pages 244-226, and the publication referred to in the bibliography notes) showing the uses of these compounds in the arts. With respect to the compounds referred to in this application, including the new compounds thereof, all of such compounds are of use and advantages in the same arts and in the same manner as set forth in the reference to Hofmann's work.

The substances $R_1O—C≡C—R_2$ can be prepared from the corresponding acetylenic ethers $R_1O—C≡CH$, in which $R_1$ means an alkyl or aryl and $R_2$ an alkyl, aryl or aralkyl radical by reacting a Grignard derivative of $R_1O—C≡CH$ with an $R_2$-halide or $R_2$-para toluene sulfonate.

Of course, many changes and variations in the composition of the reaction components, in the reaction conditions, temperature, duration, and pressure, in the methods of working up and of purifying the resulting reaction products may be made by those skilled in the art in accordance with the principles set forth herein and in the claims annexed hereto.

I claim:

1. In a process of preparing heterocyclic compounds of the formula

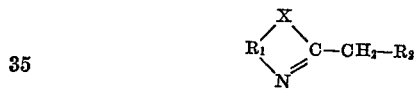

wherein $R_1$ is a hydrocarbon group with 2 to 3 carbon atoms chain-linked between the hetero groups;

$R_2$ is a member selected from the group consisting of hydrogen, an alkyl hydrocarbon radical, and aryl hydrocarbon radical, and an aralkyl hydrocarbon radical; and X is a member selected from the group consisting of oxygen, sulfur, the imino group, and a substituted imino group;

the steps comprising heating an alkoxy acetylene compound of the formula

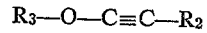

wherein $R_2$ is the same member as indicated above, and $R_3$ is an alkyl radical with an amino compound of the formula

wherein $R_1$ and X are the same members as indicated above, so as to split off the alkoxy group in the form of the corresponding alcohol and to condense the reactants with ring closure, and isolating the resulting heterocyclic condensation product from the condensation mixture.

2. The process according to claim 1, wherein condensation is carried out in the presence of a catalyst selected from the group consisting of mercuric oxide and mercuric sulfate.

3. The process according to claim 1, wherein the alkoxy acetylene compound is ethoxy acetylene.

4. The process according to claim 1, wherein the amino compound is an amino alcohol.

5. The process according to claim 1, wherein the amino compound is a diamine.

6. The process according to claim 1, wherein the amino compound is a thiol amine.

References Cited in the file of this patent

UNITED STATES PATENTS

| | | |
|---|---|---|
| 2,633,466 | Wallingford | Mar. 31, 1953 |
| 2,648,664 | Ratchford | Aug. 11, 1953 |

FOREIGN PATENTS

| | | |
|---|---|---|
| 669,585 | Great Britain | Apr. 2, 1952 |